(12) United States Patent
Dines et al.

(10) Patent No.: US 6,950,806 B2
(45) Date of Patent: Sep. 27, 2005

(54) SALES TRANSACTIONS FOR TRANSFER OF COMMODITIES

(75) Inventors: David Dines, Wayzata, MN (US);
Mark Tracy, Minneapolis, MN (US);
Joseph Stone, Petit Lancy (CH);
Dennis Inman, Eden Prairie, MN (US);
Jeffrey Seeley, Chanhassen, MN (US)

(73) Assignee: Cargill, Inc., Minneapolis, MN (US)

( * ) Notice: Subject to any disclaimer, the term of this patent is extended or adjusted under 35 U.S.C. 154(b) by 129 days.

(21) Appl. No.: 09/862,992

(22) Filed: May 22, 2001

(65) Prior Publication Data

US 2002/0052793 A1 May 2, 2002

Related U.S. Application Data

(60) Provisional application No. 60/245,412, filed on Nov. 2, 2000.

(51) Int. Cl.$^7$ .............................................. G06F 17/60
(52) U.S. Cl. ....................................................... 705/37
(58) Field of Search ............................. 705/37, 35, 20, 705/400

(56) References Cited

U.S. PATENT DOCUMENTS

| | | | |
|---|---|---|---|
| 5,557,517 A | * | 9/1996 | Daughterty, III ............... 705/37 |
| 5,724,524 A | * | 3/1998 | Hunt et al. ...................... 705/37 |
| 5,884,286 A | * | 3/1999 | Daughtery, III ................ 705/36 |
| 6,263,321 B1 | * | 7/2001 | Daughtery, III ................ 705/36 |
| 2001/0049651 A1 | * | 12/2001 | Selleck .......................... 705/37 |
| 2002/0069155 A1 | * | 6/2002 | Nafeh et al. ................... 705/37 |
| 2002/0138400 A1 | * | 9/2002 | Kitchen et al. ................ 705/37 |
| 2003/0083973 A1 | * | 5/2003 | Horsfall ......................... 705/37 |
| 2003/0093360 A1 | * | 5/2003 | May .............................. 705/37 |

FOREIGN PATENT DOCUMENTS

JP           11353361 A   * 12/1999     ........... G06F/17/60

OTHER PUBLICATIONS www.cme.com.*
www.cbot.com.*

* cited by examiner

*Primary Examiner*—F. Zeender
(74) *Attorney, Agent, or Firm*—Shumaker & Sieffert PA

(57) ABSTRACT

A method for transacting transfers of commodities involves observing the price of a commodity at several observation points over a period of time. In one embodiment, a maximum price is specified. For each observation point, the maximum price is selected in the event the observed price is greater than the maximum price, or the observed price is selected in the event the observed price is less than the maximum price. The price for a quantity of the commodity then is calculated based on the average of the selected prices and a premium. Individual contracts can be aggregated to reach more acceptable trading quantities and intervals, enabling participation of a derivative hedging products service provider and intermediate parties such as resellers and reseller services companies. Aggregation can be carried out manually or automatically, and configured to support anonymity of various parties in the transaction chain.

12 Claims, 2 Drawing Sheets

SALES TRANSACTIONS FOR TRANSFER OF COMMODITIES

This application claims priority from U.S. provisional application No. 60/245,412, filed Nov. 2, 2000, the entire content of which is incorporated herein by reference.

TECHNICAL FIELD

The invention relates to the commodities business and, more particularly, to transactions involving the exchange of commodities.

BACKGROUND

To offset some of the risks associated with market volatility, commodities sellers sometimes enter into trading agreements with buyers of commodities. The agreements often set prices based on futures, and may include quantity requirements, price floors, and price ceilings. With a marketing agreement, the seller may achieve some level of comfort in his ability to market commodities at a reasonable price. The agreement thereby reduces the seller's vulnerability to price risks that can cut into profits. In turn, the buyer achieves access to a predetermined quantity of the commodity.

Many buyers hedge the implicit risks associated with the price obligations in the agreement. In general, a buyer's "hedging" involves trading to protect the buyer against the risk of an unfavorable price change from the time the marketing agreement is made to the time that the commodities are actually purchased. Hedging may involve trading futures contracts and/or options on futures contracts. Options may be purchased from a derivatives hedging products (DHP) supplier or from another options writer.

SUMMARY

The invention is directed to a method for transacting exchanges of commodities. The exchange may be transacted between a buyer and a seller who is a producer, or between a buyer and a seller who is not a producer. A seller, other than a producer, may be an entity that buys commodities from a producer and then resells the commodities to another buyer. Thus, a buyer may contract directly with a producer or with an intermediary in the form of a buyer/reseller of commodities.

In one embodiment, the invention provides a method for transacting transfers of commodities, the method comprising observing the price of a commodity at observation points over a period of time and specifying a maximum price. The method further provides for selecting a price at each of the observation points, selecting the maximum price in the event the observed price is greater than the maximum price, or selecting the observed price in the event the observed price is less than the maximum price. The method also comprises calculating a price for a quantity of the commodity based on the average of the selected prices and a premium above the average, and paying the calculated price to a seller of the quantity of the commodity.

In another embodiment, the invention provides a method for transacting transfers of commodities, the method comprising observing the price of a commodity at observation points over a period of time and specifying a minimum price. The method further provides for selecting a price at each of the observation points, selecting the minimum price in the event the observed price is less than the minimum price, or selecting the observed price in the event the observed price is greater than the minimum price. The method also comprises calculating a price for a quantity of the commodity based on the average of the selected prices, less a discount below the average, and paying the calculated price to a seller of the quantity of the commodity.

The methods can provide a producer or other seller with greater price certainty. One method can further provide a seller a premium in exchange for an agreement to accept a maximum, or "cap," on the price at each of the observation points used to produce the calculated price, or a guaranteed minimum or "floor" price in exchange for a discount.

In return, the buyer attracts more producers and resellers, and benefits from greater certainty with respect to supply quantity. The buyer then can hedge the implicit risks associated with the price obligations. Thus, the premium will result in some combination of revenue enhancement and/or hedge protection for the contracting parties.

In another embodiment, the invention provides a method comprising preparing contracts for delivery of quantities of a commodity between a buyer and producers, and aggregating the contracts into a smaller number of contracts between the buyer and a derivatives provider.

The details of one or more embodiments of the invention are set forth in the description below. Other features, objects, and advantages of the invention will be apparent from the description, and from the claims.

DETAILED DESCRIPTION

Figure 1:
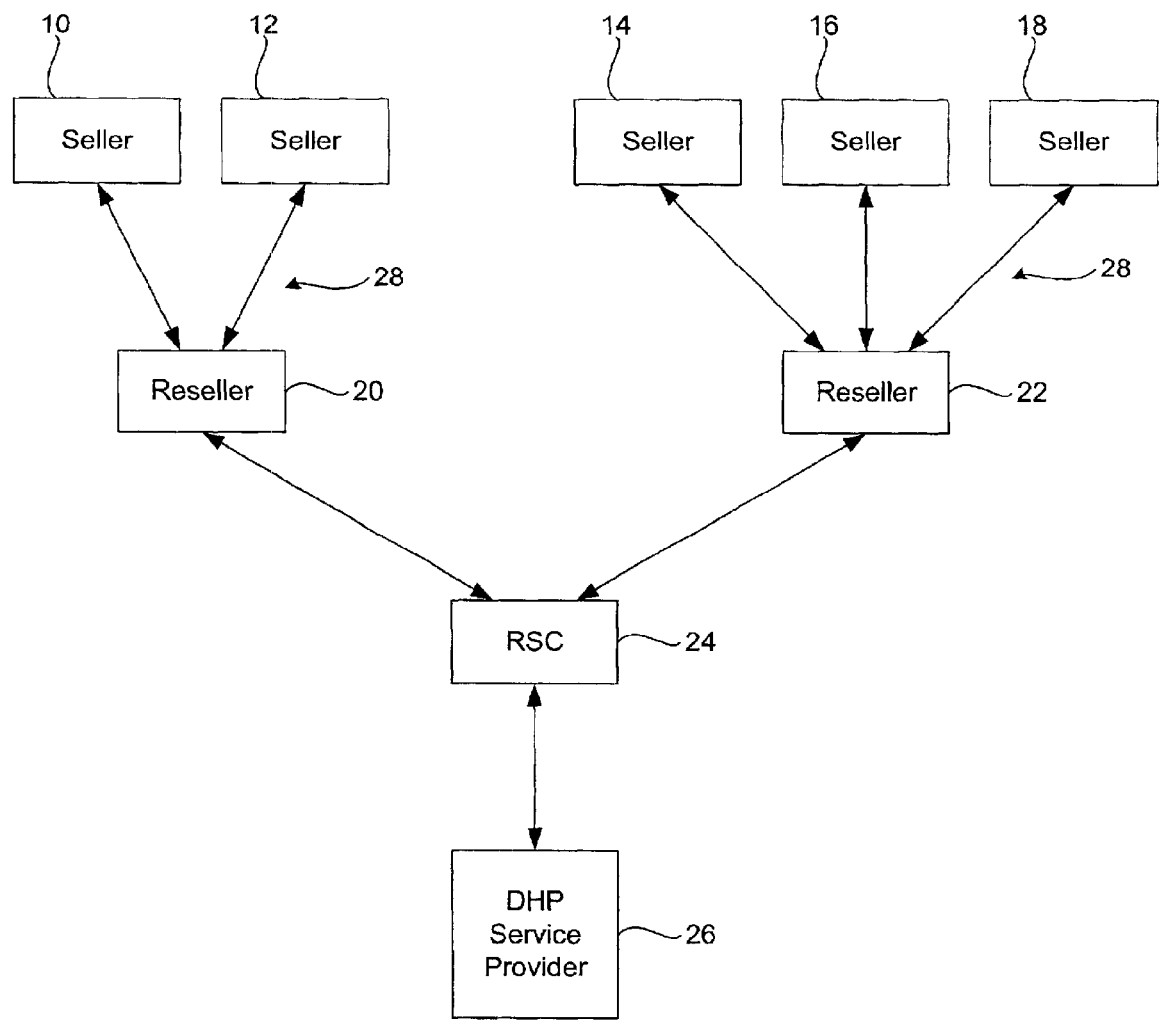
FIG. 1 is a block diagram illustrating a transaction chain for delivery of an aggregated quantity of contract product.

In accordance with the invention, a method for transacting transfers of commodities involves observing the price of a commodity at observation points over a period of time. The method further involves specifying a maximum price. Then, a price is selected for each of the observation points. The maximum price is selected in the event the observed price is greater than the maximum price. Otherwise, the observed price is selected in the event the observed price is less than the maximum price.

In the following discussion, the scenario of a maximum price and a premium will be used, but the method may also involve a minimum price and a discount. As with the maximum price, a price is selected for each of the observation points. The minimum price is selected in the event the observed price is less than the minimum price. Otherwise, the observed price is selected in the event the observed price is greater than the minimum price.

A price for a quantity of the commodity then is calculated based on the average of the selected prices and a premium or discount. The premium or discount may be set above, equal to, or below an average observed price during a given time frame depending on the specifics of a distinct contract or combination of distinct contracts. Ultimately, a cash price based on the calculated price is paid to a seller of the quantity of the commodity.

As a simple example, if there are five observation points during a given period of time, the price for the commodity is determined at each observation point. The contract price for the commodity is then the average of the five observation point prices. If any observation point price exceeds the maximum price, however, the maximum price is substituted for that observation point price. So, if the maximum price per unit of a commodity is 330.00, and the five observation point prices are 311.00, 325.00, 325.00, 351.00, and 358.00, the last two observation point prices (351.00 and 358.00) are capped at the maximum of 330.00. Thus, the prices that are used in the averaging calculation are 311.00, 325.00, 325.00, 330.00, and 330.00, i.e., the selected prices. The price for the seller is then the calculated average price plus the premium, which is multiplied, as a per unit price, by the applicable quantity to produce the payment amount. The payment amount may be adjusted for various factors, such as for basis or for the quality of the commodity.

The term "producer" may refer to any producer or manufacturer of a commodity, from an individual manufacturer to a large corporate operation. A "commodity" produced by the producer may take the form of any commodity commonly traded or likely to be traded in the future on an open or closed market basis. Examples of commodities that are presently traded on the open market include crude oil, heating oil, unleaded gasoline, jet fuel, kerosene, propane, water, communication or computing bandwidth, semiconductor chips, pollution/emission rights, gold, silver, palladium, aluminum, copper, steel, lead, other metals, and the like.

A "buyer" may take the form of an end purchaser of the commodity for processing, integration, or resale, or any other outlet for the commodity, and may form part of an integrated commodities trader, or an entity or collection of entities that purchase commodities and trades them on an open market. A "seller" may be a producer or any other entity that buys commodities from a producer or elsewhere and resells them to a buyer. Thus, the seller may be a reseller or "middleman" who trades in commodities but does not produce, process, or integrate them. A buyer, at a given level in the transaction chain, also may be a reseller. An agreement in support of the transaction may be between producer and a buyer, or between a buyer/reseller and a buyer. Thus, a buyer/reseller may have contractual obligations to both the buyer and the producer, and can be viewed as an intermediary.

For an energy commodity such as crude oil, an example transaction chain could include an oil producing company who sells to a middleman that operates a tanker fleet. The middleman may ship to a middleman refiner, who sells to a middleman trucking company. Finally, the trucking company may sell to a gas station owner, who dispenses gasoline to the end consumer.

With water as the commodity, an example transaction chain could include a state that owns a reservoir, and sells to a water utility company. The water utility company may then sell to an irrigating farmer.

For metals, an example transaction chain could include a mining company, who sells to a shipping company. The shipping company may sell to a processor, who then sells to an end processor or integrator, e.g., an automotive parts company or automobile manufacturer.

A method in accordance with the present invention agreement provides an alternative to sellers such as producers and buyer/resellers. It provides an additional premium over a modified average price observed during a given time frame for a quantity of commodity to be exchanged. To help make the premium feasible for both the buyer and the seller, however, the method requires a price limit in the form of a maximum price. The price at each observation point is compared to the maximum price, the smaller of which is used in the modified average calculation. In this manner, a buyer's customer, e.g., a producer, can get paid a modified average plus a known premium. Conversely, a seller's customer, e.g., a commodities trader, can be assured that the calculated price will not exceed a maximum price plus the premium. This type of contract gives the seller the average plus a premium, enabling him to beat the average price. Input into the average is capped but at a very attractive level for the producer. Also, the contract can be arranged as a zero cost contract.

Notably, there is no limit on how low the average price may go for purposes of calculating the price. However, the premium provides some degree of fixed compensation against excessive drops in average price. Thus, the premium is earned in exchange for placing a limit on each of the observation point prices that are used in calculation of the modified average contract price. The premium may be paid or received at any time agreed upon by the parties. Timing of payment could result in implicit financing revenue or cost to either of the parties.

Also, the resulting sale can be combined with an option in a single contract to achieve all of the seller's objectives while still remaining in compliance with existing regulations. In particular, the maximum price limit on each of the observation point prices can be modeled as an option extending between the seller and buyer. In effect, the seller sells the buyer an option to purchase at the maximum price at each observation point. The option has value if the market price exceeds the maximum price at the observation point. In practice, the buyer will agree to purchase some quantity of commodity from the producer or reseller and pay the average of the observation point prices over a known period of time. Again, in exchange for the known premium, the producer or reseller foregoes the value of any averaging points in excess of the maximum price limit.

The arrangement may be modeled as a purchase by a buyer of a strip of options from the seller. The options, which may be structured as calls, puts or both, expire at different times. The options may expire daily, or the options may expire less frequently. The model may value the options in the strip individually, or the model may value the options in the strip in the context of the running average obtained from the observed prices at past observation points. Unlike a publicly-traded option, however, it will ordinarily be mandatory for the seller to make delivery, and for the buyer to take delivery.

In theory, a seller such as a producer or reseller could obtain an average price by his own efforts, without having an arrangement with a buyer. In practice, however, it may be difficult for seller to attain such a result by individual effort. To receive an average price, the seller must take the time and effort to sell a portion of the commodity every day. This generally is not practical due to time demands and the fact that trading increments in organized markets are unlikely to exactly match the necessary quantity per averaging period. The typical size range for a seller may not support the necessary daily activity and trading increments.

Aggregation can avoid the above problems and thereby facilitate implementation of the method. In particular, manual or automated aggregation of individual contracts can provide administrative efficiency and convenience to some parties. Aggregation of contracts can also be used to generate larger and more practical trading increments.

In addition, aggregation of individual contracts can provide identity protection, i.e., anonymity, to any party desiring it for its customer/client base or itself depending on the party's place in a given supply chain. Confidentiality of the individual buyers or sellers involved in the transaction chain can be assured. An intermediate reseller need not disclose the identities of the parties on opposite sides of the intermediate reseller in the transaction chain. This anonymity helps intermediaries preserve their relationships with their customers. This is desirable because, in some cases, the supplier to the intermediary may have other parts, divisions, or departments in its organization that could compete head-to-head with the intermediary for business. If identity is preserved, however, an impediment to potential new business between the customer and intermediary is eliminated. In other words, the parties can transact business with less fear of exchanging sensitive information to the detriment of either party's business. Confidentiality of the individual sellers or producers involved in the transaction chain can be assured. In particular, the intermediate reseller need not disclose the identities of the parties on opposite sides of the reseller in the transaction chain.

Aggregation of quantities can be done manually by an intermediary receiving contract quantities from its locations or staff by any conventional mode of communication such as verbal, facsimile, telephone, mail, email and the like. This approach would require one or more persons associated with the intermediary to manually sort the contract quantities and notify a derivatives dealer of an aggregated quantity. Although manual aggregation is workable, it may be slow and prone to human error.

Automated aggregation is generally more efficient. Automated aggregation makes the frequent or even infrequent accumulation of small quantity individual contracts readily efficient. The contracts are therefore more manageable. The result is that parties can transact in practical quantities relative to trading increments, and the quantities can be updated at frequencies ranging from fractions of an hour to weeks or months. By aggregating, the buyer can enhance revenue and achieve hedge protection on a practical level.

Accordingly, it may be desirable to receive and aggregate quantities automatically, for example, using a computer network such as the internet. Private wide area networks and the use of intranet servers also may be used to aggregate quantities. In each case, the intermediary may load quantities into an aggregation engine running on a local workstation or a remote server.

Typically, those contracts to be aggregated are executed during a sign-up period. At that time, the terms of averaging will be known to the buyer and all participating sellers. In particular, the observations points and maximum price will be known. At the conclusion of the sign-up period, the total aggregated quantity will be known as well.

Pricing, analysis and hedging of contracts can be done using a combination of recorded known averaging points and remaining unknown averaging points, which may be modeled as strip option values all adjusted for present value. To automate the process, a model can be employed that calculates the value of the aggregated contracts and the hedging measurements and/or requirements. The benefit of over-the-counter derivatives can be realized across the commodity supply chain by embedding them into the physical delivery contract.

The aggregated and, advantageously, anonymous quantity is then delivered to an options provider, such as a DHP service provider. Communication of the automatically aggregated quantity to the DHP service provider may take place manually or via intranet or Internet tools.

As an example, assume that today is Nov. 1, 2002 and that February 2003 futures for gold are trading at 311.00 (dollars per ounce) at a given market. A seller wishes to sell his commodity to a buyer for future delivery in November 2003. The seller would like to earn a price in excess of the average observed between November 2002 and November 2003, if prices remain depressed or move lower, and would like the opportunity to participate somewhat in the event of rising prices if they occur. In addition, the seller believes the prices are unlikely to sustain increases above 350.00 and would find that price acceptable for sale of his output.

Therefore, the seller is willing to forego potential gains above 350.00, in exchange for being guaranteed a premium of 5.00 dollars above the average, with the added condition that no averaging point can have a value in excess of 350.00. Thus, a maximum payment of 355.00 (the max of 350.00 plus the 5.00 dollar premium) per unit is possible, if the average were at or above the 350.00 level.

Assume further that a buyer to whom the seller wishes to sell his output is owned by a company that has a DHP service. Consequently, the sale of the physical commodity can be combined, in financial effect, with a swap agreement in a single contract to achieve all of the seller's objectives.

A "swap agreement" may refer to an agreement in which one party agrees to deliver a fixed price for a given quantity of goods to another party that agrees to deliver a variable price for the same quantity of goods. Typically, a swap agreement converts a varying or unpredictable cost into a fixed or known cost. Goods can include anything with an observed and potentially variable price. The way that the price varies can be based on direct observation, or based on some predefined mathematical formula(s) using directly observed input(s) which may vary in value. The number of times that payments are exchanged can be from one to infinity, but the dates of the observations that determine the payments, and the timing of the payments once determined, are properly defined in advance.

The seller and the buyer may agree to set the term with the beginning and an ending for the averaging and set a maximum limit on the average of 350.00. With a method in accordance with the invention, these objectives can be achieved. The transaction is tied to a physical delivery. The seller is ordinarily committed to make physical delivery, and the buyer is ordinarily committed to take delivery. In a first case, where prices fall from 311.00 on Nov. 1, 2002 to 249.00 on Nov. 14, 2003, earning an average of 277.00 is better for the seller than taking the ending value. In addition, earning the extra 5.00 dollars above the average for total of 282.00 is an even better outcome for the seller.

In a second case, where prices rise from 311.00 on Nov. 1, 2002 to 339.0 on Nov. 14, 2003, the seller is rewarded by a good market and is ultimately paid based upon the average of 335.00 plus 5.00 dollars for a total of 340.00.

In a third case, where prices rise from 311.00 on Nov. 1, 2002 to 366.00 on Nov. 14, 2003, the seller receives an average of 347.00 plus the premium of 5.00 for a total of 352.00. This result is more than the 350.00, which should be found acceptable by the seller.

In a fourth case, where prices rise from 311.00 on Nov. 1, 2002 to 412.00 on Nov. 14, 2003, the seller receives an average of 351.00 plus a premium of 5.00 for a total of 356.00. Again, this result is in excess of the price the seller found acceptable, particularly in light of the premium agreed upon by the seller and the buyer. At the same time, the buyer benefited from a maximum limit (350.00) on the average price, and was better able to gauge the risk of rising prices and hedge that risk appropriately.

The above example is made especially feasible by an aggregation technique in accordance with the invention, such as automated aggregation and aggregation with anonymity. To make the benefits of derivative based hedging products available to the majority of sellers who cannot reasonably trade directly with the DHP service, it is desirable to make the benefits of the derivative-based hedging products available through the resellers themselves.

In one simple form, a company with a DHP service provides the transactional product to an independent reseller, who would then pass the financial benefits of the derivative-based hedging product onto the seller in the form of a physical contract between the seller and the reseller. For this approach, the independent reseller may need to be swap-eligible under applicable regulations. In addition, the independent reseller and the company with the DHP service should mutually evaluate and accept each other's credit risk. Then, the company with the DHP service would be responsible for educating and servicing the needs of the independent resellers as they serve their seller/customers.

Meeting all of the above conditions can be impractical. Ordinarily, it will not be cost-effective for the company with the DHP service to have a swap relationship with a single reseller. The transaction quantity is too small to justify the initial and maintenance credit work. Further, even if the credit issues did not exist, the likely trading size and frequency of individual trades that would be passed from the seller to the company with the DHP service via the independent reseller would most often be too small and of a frequency that is economically unrewarding. The company with the DHP service also may have difficulty in efficiently educating and serving the needs of individual sellers and resellers.

To overcome these hurdles, a method of reaching a greater number of resellers with a single entity or shortened list of swap relationships is desirable. Also, it is desirable to aggregate the individual sellers' contracts so that they can be delivered to the DHP service in economically practical quantities and at acceptable frequencies. Aggregation can be realized in the DHP service as a swap agreement with an intermediary that owns, is owned by, and/or services a significant group of independent resellers. For simplicity, we can refer to this intermediate entity as an reseller service company (RSC). Having a relationship with an RSC allows the DHP services provider to maintain only one swap and credit arrangement, but gain access to the output of a wide variety of resellers and ultimate customers/sellers. Thus, for the same or similar fixed and variable cost, many independent resellers and/or sellers can be reached with one of only a few swap, credit, and education relationships to maintain.

The DHP service provider delivers the financial hedge component of the marketing contract to the RSC, who in turn delivers it to its member reseller network. The member reseller can then combine the financial hedge with the physical purchase contract to provide an innovative marketing contract. In addition, the DHP service provider can provide the RSC with support in the form of marketing materials, contract language, commodity education, and transaction reporting and monitoring. The DHP service provider may elect, for example, to split some of the profit with the RSC and/or pay the RSC a flat fee in exchange for marketing the product. Alternatively, the DHP service provider may not split revenue. In some cases, the DHP service provider may require that the RSC pay a fee to the DHP service provider to gain access to the product. Fees may be charged or exchanged at one or more levels in the transaction chain. In return, the DHP service provider could require that the RSC leverage its marketing power for the distribution of the product.

The RSC and its related resellers will already have an infrastructure, which efficiently services frequent trades, education needs, and credit issues of small size and low frequency. When these trades include a solution provided by a DHP service provider as described herein, the DHP portion of the trade can be communicated back to the DHP service provider at a predetermined time and/or at predetermined quantity intervals via phone, facsimile, mail, or email. Thus, the DHP service provider will be able to help producers it could not otherwise help economically and legally, with all parties remaining in compliance with applicable regulations.

In one embodiment, aggregated trading information can be communicated using an Internet or intranet based tool that automatically provides all of the necessary trading information to the RSC and the DHP service provider. The pertinent information, such as quantity, averaging term, maximum average limit, and contract privity data, can be entered into a computer workstation at the reseller level and passed all the way through to the DHP service provider. Alternatively the information can be entered by the RSC and sent directly to the DHP service provider. A software application running on the workstation into which the information is loaded can be configured to aggregate individual quantities and generate new aggregated agreements for presentation by the RSC to the DHP service provider.

For some embodiments, it is conceivable that the initial information creating a contract with the RSC could even be entered by a seller via the Internet. From that point forward, the information entered by the seller may be handled in an automated manner for submission to the RSC and for generation of appropriate contracts. Indeed, the information entered by the seller may be handled automatically not only for the RSC but also subjected to automated aggregation for presentation to the DHP service provider.

In this manner, the entire chain between the seller, the reseller, the RSC, and a DHP service provider can be automated to deliver aggregated contracts that can be handled more efficiently by the DHP service provider. The necessary applications software devoted to the automated aggregation function can be embodied as software loaded on a computer workstation that interacts with additional computers via appropriate communications ports. Alternatively, the application software may be embodied as HTML or other web page code executable by a web browser, along with both client side and server side scripting as appropriate.

Thus, the seller may be equipped with a web browser for data entry, while the reseller or RSC maintains a web server running an aggregation engine that accumulates the data for several sellers and packages it into an aggregated contract that satisfies the necessary trading quantity and frequency. The aggregated contract may then be forwarded to a web server associated with that DHP service provider, which electronically delegates and accepts the aggregate contract, with or without human intervention, completing the transaction chain. When delivery has been made, or at some earlier or later time as agreed upon by the parties, the DHP service provider pays the RSC. The RSC is responsible for payment to an reseller, while the reseller is responsible for payment to the seller/customer. Like the aggregation process, the payment process can be executed automatically. For example, aggregate payments made by the DHP service provider can be aggregated by the RSC in paying its customers, whether they be individual resellers or sellers.

Aggregation and automation provides many benefits to each party involved in the supply chain. At the same time, however, there are potential business threats to the intermediate parties between the seller and the DHP service provider. If a DHP service provider knows the identity of the ultimate seller/customer, it is capable of eliminating the middleman so to speak, and cutting the RSC or reseller out of the transaction chain for a variety of commodity and/or hedging opportunities. This is especially the case if a DHP service provider has a presence in the same geography as the particular reseller involved in the transaction. Further, if a DHP service provider knows that a specific reseller is experiencing high-level business, the RSC could feel threatened by the possibility that the DHP service company could purchase the reseller or eliminate the RSC in some other way.

By providing anonymous aggregation in accordance with the invention, however, threats to the RSC can be reduced significantly. Anonymity can be readily accomplished by filtering information as it flows through the automated channels between the seller, the reseller, the RSC, and the DHP service provider. Specifically, the arrangement between the RSC and the DHP service provider can be configured to pass on only the information that the DHP service provider needs to know in order to serve the RSC in providing hedging products.

If the geographical business area for the reseller overlaps with one covered by a company that is related to or owned by the DHP service company or a holding company thereof, the reseller customer information could be learned by a competitor for use in business that does not pertain to the functions served by the DHP service company. Consequently, the reseller could lose both core business and its share of derivative hedging revenue to a newly informed competitor.

In addition to its defensive value, anonymity can provide a marketing benefit. If the RSC has valuable brand name recognition with its reseller and/or seller customers, and its brand name recognition exceeds that of the brand name associated with the DHP service provider, there may be an advantage in private labeling of the products. In other words, use of the RSC brand name in lieu of the brand name of the originator of the hedging product, i.e., the DHP service provider, may be more effective in a given market segment. Thus, anonymity works in the opposite direction to that described above, concealing the identity of the DHP service provider from the individual resellers or producers. In this case, anonymity is a significant benefit to both the RSC and the DHP service provider.

Although the aggregation and anonymity features may be particularly useful for products such as those described herein, i.e., maximum average contracts and the like, they are not limited in that regard. On the contrary, the aggregation and anonymity features can be exploited for a variety of products, and especially those where administrative overhead, quantity, and frequency issues make handling of individual transactions difficult and inefficient for the typical DHP provider. An example of a transactional method to which the aggregation and anonymity features may be readily applied is that disclosed in U.S. provisional application Ser. No. 60/245,373, to David E. Dines et al., entitled "Sales Transactions for Transfer of Commodities," filed Nov. 2, 2000. Notably, aggregation and anonymity may be greatly facilitated by the proliferation of Internet technologies, and may find use on a widespread basis in a variety of transactions involving commodities.

FIG. 1 is a block diagram illustrating a transaction chain for delivery of an aggregated contracts product. As shown in FIG. 1, DHP service provider 26 may interact with RSC 24 by executing a financial swap with the RSC 24 and also paying RSC 24 a fee to market the derivative product (32). RSC 24, in turn, executes a financial swap with one or more resellers 20, 22 (30). Resellers 20, 22 offer the contract (28) to each of a number of sellers 10, 12, 14, 16 and 18. Sellers 10 and 12 are in privity with reseller 20, and sellers 14, 16 and 18 are in privity with reseller 22. Resellers 20 and 22 are in privity with RSC 24.

RSC 24 and the DHP service provider 26 are in privity with one another. The quantities produced by each seller can then be aggregated at the level of reseller 20 or 22 and/or at the level of RSC 24 and passed upstream to DHP service provider 26. Each seller, as to his individual quantity, receives an assurance of an average price plus a premium, subject to a maximum average limit. Notably, the structure shown in FIG. 1 facilitates anonymity.

As shown in FIG. 1, RSC 24 and DHP service provider 26 swap cash flow (32). As an example, RSC 24 could be paid an average from Jun. 1, 2002 to Sep. 14, 2002. In exchange, DHP service provider 26 may receive from RSC 24 the closing price for the appropriate commodity on Sep. 14, 2002 (32). RSC 24 may pay the reseller an average from Jun. 1, 2002 to Sep. 14, 2002 plus a premium (30). In turn, RSC 24 receives from the reseller the closing price for the appropriate commodity on Sep. 14, 2002. The reseller then pays the average plus the premium to sellers 10, 12, 14, 16 and 18 for their commodities. The reseller may sell futures on Sep. 14, 2002 to offset its obligations. Thus, the payments between a reseller and a seller are physical contract payments tied to delivery of the commodity (28).

In this way, sellers 10, 12, 14, 16 and 18 obtain financial benefits of hedging products without dealing with DHP service provider 26 directly. Although sellers 10, 12, 14, 16 and 18 may know the financial arrangements that make the contracts (28) economically viable, it is not essential to the invention that sellers 10, 12, 14, 16 and 18 have this knowledge. The contracts (28) between sellers 10, 12, 14, 16 and 18 and individual resellers 20 and 22 need not mention hedging products or DHP service provider 26.

Figure 2:
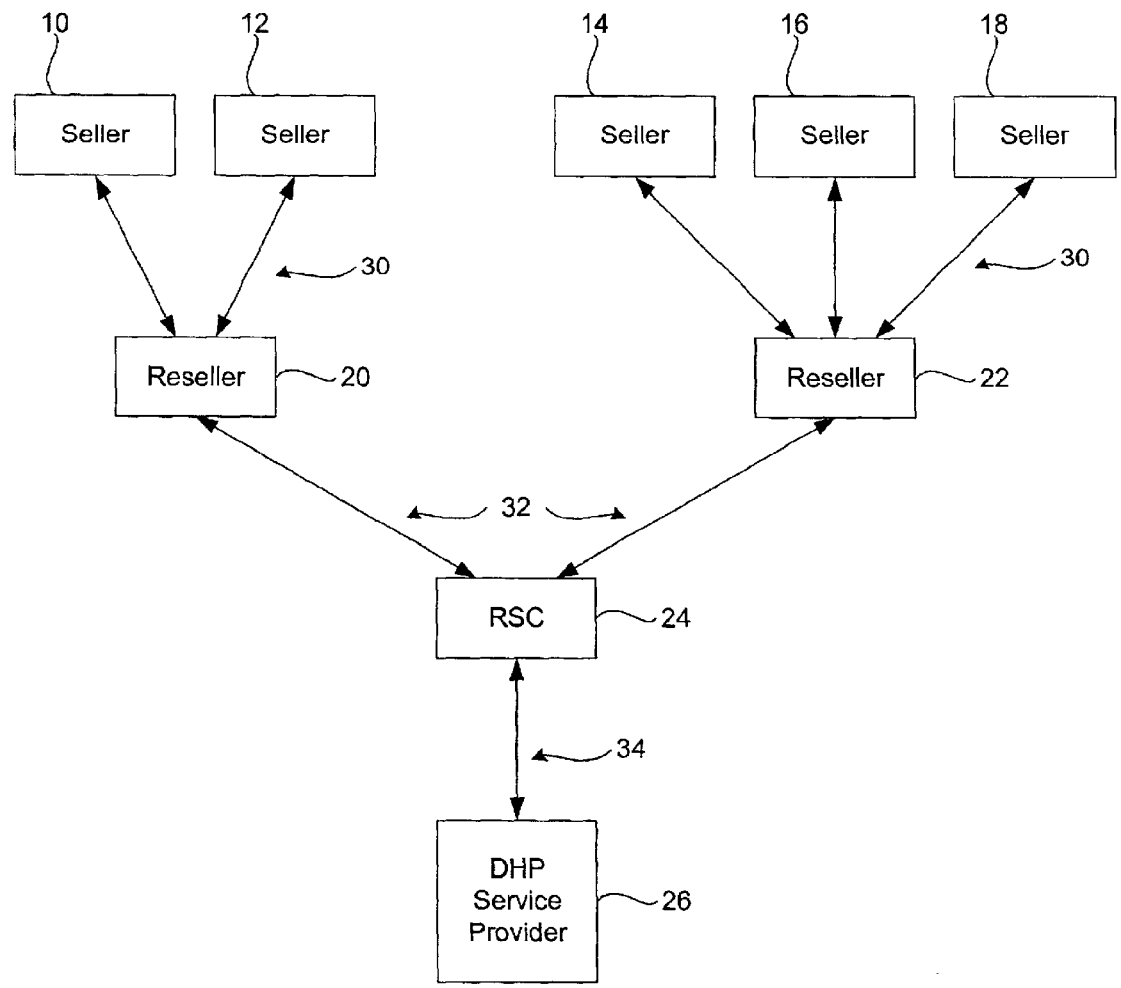
FIG. 2 is a block diagram illustrating provision of support to the transaction chain illustrated in FIG. 1.

FIG. 2 is a block diagram illustrating provision of support to the transaction chain illustrated in FIG. 1. As shown in FIG. 2, DHP service provider 26 may provide to RSC 24 necessary education, marketing materials, and products support (34) to facilitate delivery of a transactional commodity as described herein. In turn, RSC 24 may pass along such features to individual resellers 20 and 22 (32), who then support individual sellers 10, 12, 14, 16 and 18 (30).

A number of embodiments of the present invention have been described. Nevertheless, it will be understood that various modifications may be made without departing from the spirit and scope of the invention. Accordingly, other embodiments are within the scope of the following claims.

What is claimed is:

1. A method for transacting transfers of commodities, the method comprising:

preparing contracts for delivery of quantities of a commodity between a buyer end sellers;

executing a software application on a computer to aggregate the contracts into a smaller number of contracts between the buyer and a derivatives provider;

observing the price of the commodity at observation points over a period of time;

specifying a minimum price;

for each of the observation points, selecting the minimum price in the event the observed price is less than the minimum price, and selecting the observed price in the event the observed price is greater than the minimum price;

calculating a price for a quantity of the commodity based an the average of the selected prices and a discount below the average; and paying to each seller an amount based upon the calculated price.

2. The method of claim 1, further comprising executing a financial swap between the buyer and the derivatives provider.

3. The method of claim 1, further comprising:

executing a financial swap between the buyer and a reseller service company; and executing a financial swap between the reseller service company and the derivatives provider.

4. The method of claim 1, further comprising receiving a marketing fee from the derivatives provider.

5. The method of claim 1, further comprising hedging the risks of the aggregated contracts.

6. The method of claim 1, further comprising maintaining anonymity between the derivatives provider and the sellers.

7. A method for transacting transfers of commodities, the method comprising:

preparing contracts for delivery of quantities of a commodity between a buyer and sellers;

executing a software application on a computer to aggregate the contracts into a smaller number of contracts between the buyer and a derivatives provider;

observing the price of the commodity at observation points over a period of time;

specifying a maximum price;

for each of the observation points, selecting the maximum price in the event the observed price is greater than the maximum price, and selecting the observed price in the event the observed price is less than the maximum price;

calculating a price for a quantity of the commodity based on the average of the selected prices and a premium above the average; and paying to each seller an amount based upon the calculated price.

8. The method of claim 7, further comprising executing a financial swap between the buyer and the derivatives provider.

9. The method of claim 7, further comprising:

executing a financial swap between the buyer and a reseller service company; and executing a financial swap between the reseller service company and the derivatives provider.

10. The method of claim 7, further comprising receiving a marketing fee from the derivatives provider.

11. The method of claim 7, further comprising hedging the risks of the aggregated contracts.

12. The method of claim 7, further comprising maintaining anonymity between the derivatives provider and the sellers.

* * * * *

UNITED STATES PATENT AND TRADEMARK OFFICE
CERTIFICATE OF CORRECTION

PATENT NO. : 6,950,806 B2
DATED : September 27, 2005
INVENTOR(S) : Dines et al.

It is certified that error appears in the above-identified patent and that said Letters Patent is hereby corrected as shown below:

Column 11,
Line 5, "an" should read -- on --.

Signed and Sealed this

Seventh Day of March, 2006

JON W. DUDAS
*Director of the United States Patent and Trademark Office*